US009112662B2

(12) United States Patent
Papasakellariou

(10) Patent No.: US 9,112,662 B2
(45) Date of Patent: Aug. 18, 2015

(54) OVERHEAD REDUCTION FOR TRANSMISSION OF ACKNOWLEDGMENT SIGNALS

(71) Applicant: Samsung Electronics Co., LTD, Suwon-si, Gyeonggi-do (KR)

(72) Inventor: Aris Papasakellariou, Houston, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 182 days.

(21) Appl. No.: 13/962,612

(22) Filed: Aug. 8, 2013

(65) Prior Publication Data

US 2014/0198737 A1 Jul. 17, 2014

Related U.S. Application Data

(60) Provisional application No. 61/753,728, filed on Jan. 17, 2013.

(51) Int. Cl.
*H04W 84/12* (2009.01)
*H04L 5/00* (2006.01)

(52) U.S. Cl.
CPC .................................. *H04L 5/0055* (2013.01)

(58) Field of Classification Search
None
See application file for complete search history.

(56) References Cited

U.S. PATENT DOCUMENTS

| 8,208,438 | B2* | 6/2012 | Han et al. ............... 370/330 |
| 8,514,826 | B2* | 8/2013 | Han et al. ............... 370/338 |
| 2010/0091708 | A1* | 4/2010 | Nishikawa et al. ........... 370/328 |
| 2010/0210256 | A1* | 8/2010 | Shen et al. .................. 455/422.1 |
| 2010/0246465 | A1* | 9/2010 | Cai et al. ..................... 370/311 |
| 2010/0271970 | A1* | 10/2010 | Pan et al. ..................... 370/252 |
| 2011/0045860 | A1* | 2/2011 | Nam et al. ................... 455/509 |
| 2011/0090825 | A1* | 4/2011 | Papasakellariou et al. ... 370/280 |
| 2011/0110246 | A1* | 5/2011 | Damnjanovic et al. ....... 370/252 |
| 2011/0201333 | A1* | 8/2011 | Kwon et al. ................. 455/434 |

(Continued)

FOREIGN PATENT DOCUMENTS

| KR | 10-1216064 | 12/2012 |
| WO | WO 2012/094151 A2 | 7/2012 |

OTHER PUBLICATIONS

International Search Report dated Apr. 22, 2014 in connection with International Patent Application No. PCT/KR2014/000434, 3 pages.

(Continued)

*Primary Examiner* — Hassan Phillips
*Assistant Examiner* — Gautam Sharma

(57) ABSTRACT

A method and apparatus for compressing resources used for transmitting acknowledgment signals from User Equipments (UEs). An acknowledgment signal is in response to detections from a UE of one or more Physical Downlink Control CHannels (PDCCHs) in respective one or more Transmission Time Interval (TTIs) within M TTIs. Each PDCCH is transmitted over Control Channel Elements (CCEs). Resources account for both CCEs in a same TTI and for TTIs within the M TTIs. A Hybrid Automatic Repeat reQuest (HARQ) Acknowledgment Resource Offset (HRO) field in a Downlink Control Information (DCI) format is used to compress resources in both CCE and TTI domains. For the first TTI of the M TTIs, all HRO values compress resources in the CCE domain while for all remaining TTIs, half HRO values compress resources in the CCE domain and half HRO values compress resources in the TTI domain.

32 Claims, 8 Drawing Sheets

(56) References Cited

U.S. PATENT DOCUMENTS

| | | | |
|---|---|---|---|
| 2011/0243066 A1* | 10/2011 | Nayeb Nazar et al. | 370/328 |
| 2011/0243090 A1* | 10/2011 | Grovlen et al. | 370/329 |
| 2011/0319120 A1* | 12/2011 | Chen et al. | 455/522 |
| 2012/0034927 A1 | 2/2012 | Papasakellariou et al. | |
| 2012/0099470 A1* | 4/2012 | Li et al. | 370/252 |
| 2012/0106478 A1 | 5/2012 | Han et al. | |
| 2012/0155337 A1* | 6/2012 | Park | 370/280 |
| 2012/0176965 A1 | 7/2012 | Zhu et al. | |
| 2012/0320848 A1* | 12/2012 | Chen et al. | 370/329 |
| 2013/0034073 A1* | 2/2013 | Aiba et al. | 370/329 |
| 2013/0155914 A1* | 6/2013 | Wang et al. | 370/280 |
| 2013/0195041 A1* | 8/2013 | Papasakellariou et al. | 370/329 |
| 2013/0230030 A1* | 9/2013 | Papasakellariou et al. | 370/336 |
| 2013/0344909 A1* | 12/2013 | Davydov et al. | 455/501 |
| 2014/0211732 A1* | 7/2014 | Nogami et al. | 370/329 |
| 2015/0016311 A1* | 1/2015 | Han et al. | 370/280 |

OTHER PUBLICATIONS

Written Opinion of International Searching Authority dated Apr. 22, 2014 in connection with International Patent Application No. PCT/KR2014/000434, 6 pages.

3GPP TSG RAN WG1 #61bis; "PUCCH HARQ-ACK Resource Mapping for DL CA"; R1-103637; Samsung; Dresden, Germany; Jun. 28-Jul. 2, 2010; 3 pages.

3GPP TSG RAN WG1 #61bis; "HARQ-ACK and RI Multiplexing in SIMO PUSCH for DL CA"; R1-103650; Samsung; Dresden, Germany; Jun. 28-Jul. 2, 2010; 3 pages.

* cited by examiner

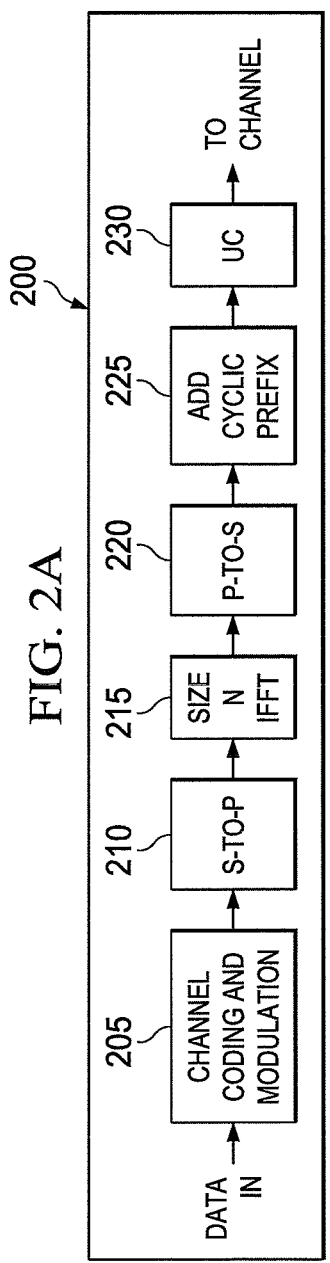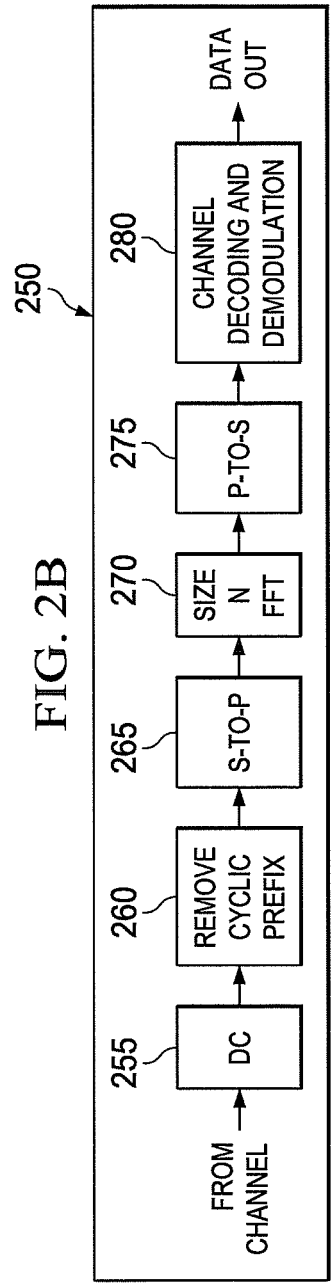

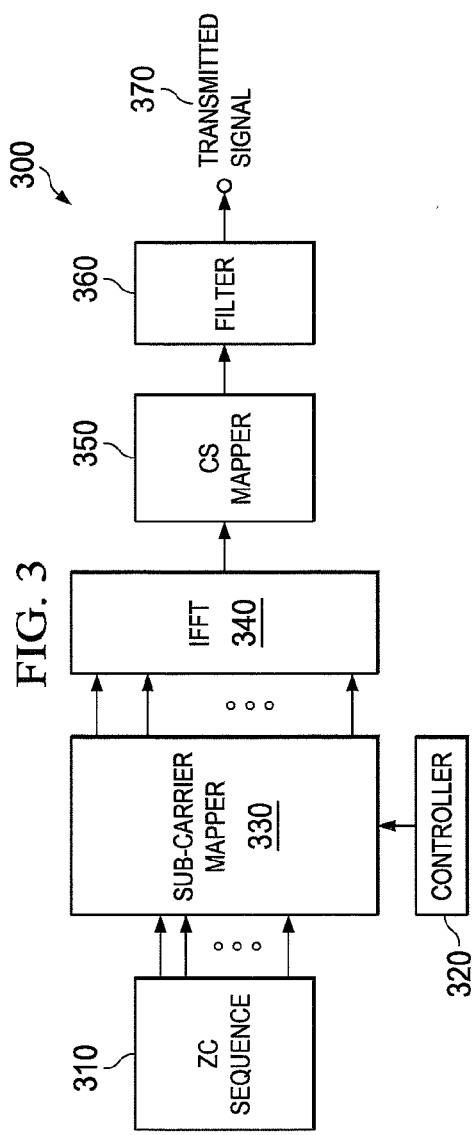
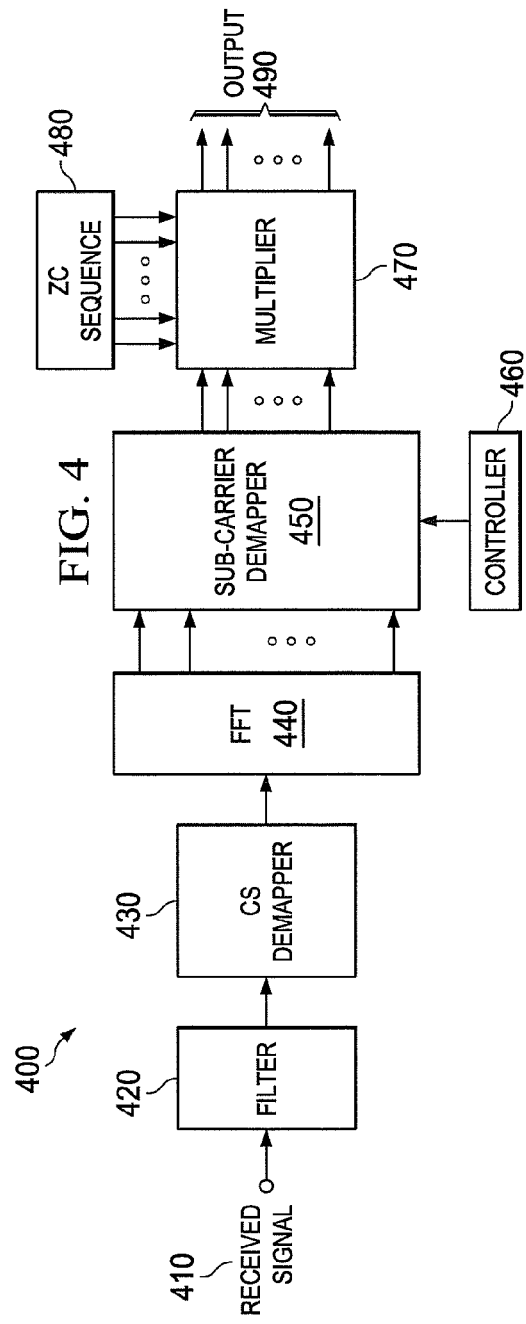

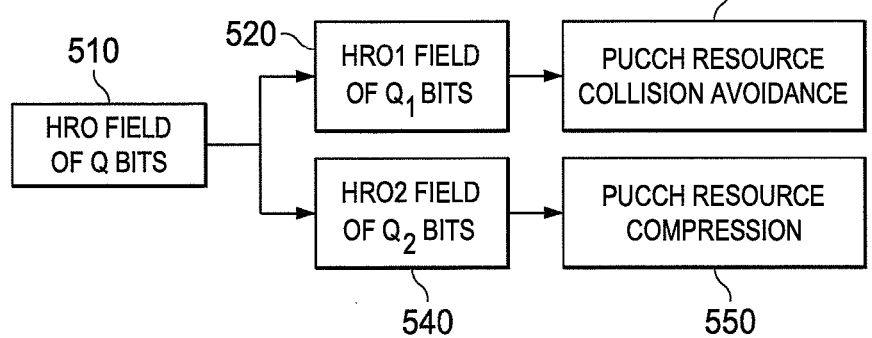
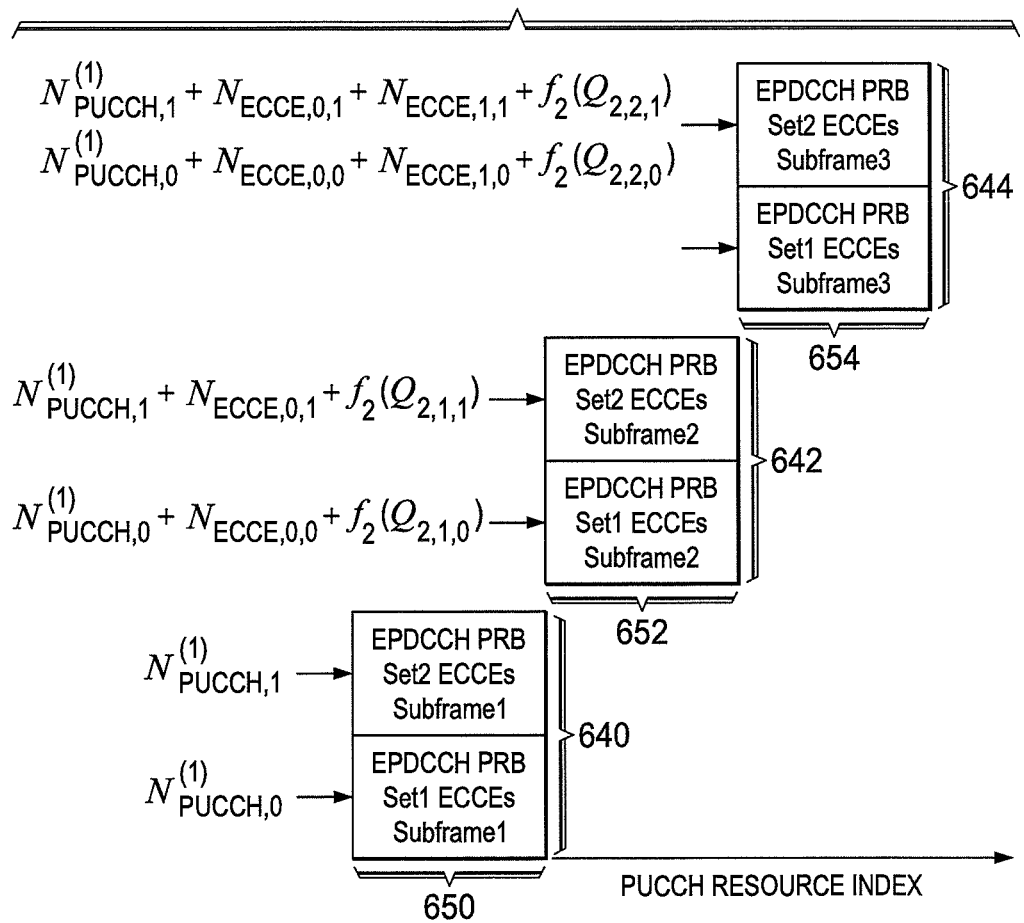

OVERHEAD REDUCTION FOR TRANSMISSION OF ACKNOWLEDGMENT SIGNALS

CROSS-REFERENCE TO RELATED APPLICATION(S) AND CLAIM OF PRIORITY

The present application claims priority to U.S. Provisional Patent Application Ser. No. 61/753,728 filed Jan. 17, 2013, entitled "Resource Overhead Reduction for Transmission of Acknowledgement Signals." The content of the above-identified patent documents is incorporated herein by reference.

TECHNICAL FIELD

The present application relates generally to wireless communication systems and, more specifically, to transmission and reception of acknowledgment signals.

BACKGROUND

A communication system includes DownLink (DL) transmissions that convey signals from transmission points such as Base Stations (BSs) or NodeBs to User Equipment (UEs) and UpLink (UL) transmissions that convey signals from UEs to reception points such as NodeBs. A UE, also commonly referred to as a terminal or a mobile station, may be fixed or mobile and may be a cellular phone, a personal computer device, etc. A NodeB, which is generally a fixed station, may also be referred to as an access point or other equivalent terminology.

DL signals consist of data signals conveying information content, control signals conveying DL Control Information (DCI), and Reference Signals (RS), which are also known as pilot signals. A NodeB transmits data information or DCI to UEs through respective Physical DL Shared CHannels (PDSCHs) or Physical DL Control CHannels (PDCCHs). A NodeB may transmit multiple RS types including a UE-Common RS (CRS) that is transmitted over substantially an entire DL BandWidth (BW) and a DeModulation RS (DMRS) that is transmitted in a same BW as an associated PDSCH or PDCCH. UL signals also consist of data signals conveying information content, control signals conveying UL Control Information (UCI), and RS. A UE transmits data information or UCI to a NodeB through a respective Physical UL Shared CHannel (PUSCH) or a Physical UL Control CHannel (PUCCH). If a UE simultaneously transmits data information and UCI, it may multiplex both in a PUSCH.

A PDSCH transmission to a UE or a PUSCH transmission from a UE may be in response to dynamic scheduling or to Semi-Persistent Scheduling (SPS). With dynamic scheduling, a NodeB conveys to a UE a DCI format through a respective PDCCH. The contents of a DCI format, and consequently its size, depend on a Transmission Mode (TM) a UE is configured for a respective PDSCH reception or PUSCH transmission. With SPS, a PDSCH or a PUSCH transmission is configured to a UE by a NodeB through higher layer signaling, such as Radio Resource Control (RRC) signaling, and occurs at predetermined Transmission Time Intervals (TTIs) and with predetermined parameters as informed by the higher layer signaling. UCI includes acknowledgment information associated with a use of Hybrid Automatic Repeat reQuest (HARQ) and is in response to correct or incorrect, respectively, receptions of data Transport Blocks (TBs) in a PDSCH or in response to an SPS release.

Accordingly, there is a need for improved techniques for transmission and reception of HARQ acknowledgment (ACK) signals referred to as HARQ-ACK signals.

SUMMARY

Embodiments of the present disclosure provide resource overhead reduction for transmission of acknowledgment signals.

In one exemplary embodiment, a method is provided for a User Equipment (UE) to transmit a Hybrid Automatic Repeat reQuest Acknowledgment (HARQ-ACK) signal in a Physical Uplink Control CHannel (PUCCH) in response to detecting one or more Physical Downlink Control CHannels (PDCCHs) of a first type transmitted from a base station over respective one or more Transmission Time Interval (TTIs) within a total number of M TTIs and within a set j of Physical Resource Block (PRB) pairs, wherein a PRB pair includes a number of sub-carriers over a TTI. The method includes detecting each PDCCH, of the one or more PDCCHs, over a respective number of Control Channel Elements (CCEs) wherein each PDCCH conveys a Downlink Control Information (DCI) format that includes a HARQ-ACK Resource Offset (HRO) information field having Q binary elements. The method also includes determining a PUCCH resource $n_{PUCCH}$ in response to a PDCCH detection in TTI m, $0 \leq m \leq M-1$, as $$n_{PUCCH} = n_{CCE,m,j} + f(HRO) + \sum_{i=0}^{m-1} N_{CCE,i,j} + N_{PUCCH,j},$$

wherein $n_{CCE,m,j}$ is an index for the first CCE of the PDCCH in TTI m, $f(HRO)$ is a mapping function for the HRO field having an even number of integer outputs, $N_{CCE,i,j}$ is a total number of CCEs in TTI i, and $N_{PUCCH,j}$ is informed to the UE from the base station by higher layer signaling, wherein for m=0 all $f(HRO)$ values are small integers with values around zero and for m>0 a first even number of $f(HRO)$ values are same as for m=0 and do not depend on the value of m and a remaining second even number of $f(HRO)$ values are larger negative integers that depend on the value of m and include a term that is the sum of one or more $-N_{CCE,i,j}$ values where $0 \leq i \leq m-1$. Additionally, the method includes transmitting the HARQ-ACK signal in the determined PUCCH resource. For Q=2, the first even number of $f(HRO)$ values is two, and the second even number of $f(HRO)$ values is two with a first value including the term $$-\sum_{i=0}^{m-1} N_{CCE,i,j}$$

and a second value including the term $-N_{CCE,m-1,j}$. For m=0, the $f(HRO)$ values are $\{-2, -1, 0, 2\}$. A first value of Q can be associated with a first value of M and a second value of Q can be associated with a second value of M, wherein the first value of Q is smaller than the second value of Q and the first value of M is smaller than the second value of M. The DCI format further includes a Downlink Assignment Index (DAI) field, and the DAI field at ITT m can indicate a total number of DCI formats transmitted to the UE from TTI 0 until TTI m and, for at least some values of m, at least one binary element from the DAI field can be used as a binary element of the HRO field.

The UE may also detect a PDCCH of a second type in TTI $m_1$, $0 \leq m_1 \leq m-1$ and $m>0$ but this does not affect the PUCCH resource determination for HARQ-ACK signal transmission. If the PDCCH is transmitted within one PRB pair, $n_{CCE,m,j}$ may be replaced by $n_{CCE,m,j}^L = \lfloor n_{CCE,m,j}/N_{CCE\_PRB,m,j} \rfloor + (n_{CCE,m,j} \mod N_{CCE\_PRB,m,j}) \cdot N_{PRB,j}$ wherein $N_{CCE\_PRB,m,j}$ is a number of CCEs within a PRB pair, $N_{PRB,j}$ is a total number of PRB pairs in the set j of PRB pairs, and $\lfloor \; \rfloor$ is a floor function that rounds a number to a smaller integer.

In another exemplary embodiment, an apparatus in a UE is provided, which includes a detector, computing unit, and transmitter configured to perform the above described method.

In another exemplary embodiment, a method is provided for a base station to receive an HARQ-ACK signal in a PUCCH in response to transmitting one or more PDCCHs of a first type over respective one or more TTIs within a total number of M TTIs and within a set j of PRB pairs. The method includes transmitting each PDCCH, of the one or more PDCCHs, over a respective number of Control Channel Elements (CCEs) wherein each PDCCH conveys a Downlink Control Information (DCI) format that includes a HARQ-ACK Resource Offset (HRO) information field having Q binary elements. The method also includes determining a PUCCH resource $n_{PUCCH}$ in response to a PDCCH detection in TTI m, $0 \leq m \leq M-1$, as $$n_{PUCCH} = n_{CCE,m,j} + f(HRO) + \sum_{i=0}^{m-1} N_{CCE,i,j} + N_{PUCCH,j},$$

wherein $n_{CCE,m,j}$ is an index for the first CCE of the PDCCH in TTI m, $f(HRO)$ is a mapping function for the HRO field having an even number of integer outputs, $N_{CCE,i,j}$ is a total number of CCEs in TTI i, and $N_{PUCCH,j}$ is informed to the UE from the base station by higher layer signaling, wherein for m=0 all $f(HRO)$ values are small integers with values around zero and for m>0 a first even number of $f(HRO)$ values are same as for m=0 and do not depend on the value of m and a remaining second even number of $f(HRO)$ values are larger negative integers that depend on the value of m and include a term that is the sum of one or more $-N_{CCE,i,j}$ values where $0 \leq i \leq m-1$. Additionally, the method includes receiving the HARQ-ACK signal in the determined PUCCH resource. For Q=2, the first even number of $f(HRO)$ values is two, and the second even number of $f(HRO)$ values is two with a first value including the term $$-\sum_{i=0}^{m-1} N_{CCE,i,j}$$

and a second value including the term $-N_{CCE,m-1,j}$. For m=0, the $f(HRO)$ values are $\{-2, -1, 0, 2\}$. A first value of Q can be associated with a first value of M and a second value of Q can be associated with a second value of M, wherein the first value of Q is smaller than the second value of Q and the first value of M is smaller than the second value of M. The DCI format further includes a DAI field, and the DAI field at TTI m can indicate a total number of DCI formats transmitted to the UE from TTI 0 until TTI m and, for at least some values of m, at least one binary element from the DAI field can be used as a binary element of the HRO field. The base station may also transmit a PDCCH of a second type in TTI $m_1$, $0 \leq m_1 \leq m-1$ and m>0 but this does not affect the PUCCH resource determination for HARQ-ACK signal reception. If the PDCCH is transmitted within one PRB pair, $n_{CCE,m,j}$ may be replaced by $n_{CCE,m,j}^L = \lfloor n_{CCE,m,j}/N_{CCE\_PRB,m,j} \rfloor + (n_{CCE,m,j} \mod N_{CCE\_PRB,m,j}) \cdot N_{PRB,j}$ wherein $N_{CCE\_PRB,m,j}$ is a number of CCEs within a PRB pair, $N_{PRB,j}$ is a total number of PRB pairs in the set j of PRB pairs, and $\lfloor \; \rfloor$ is a floor function that rounds a number to a smaller integer.

In another exemplary embodiment, an apparatus in a base station is provided, which includes a transmitter, computing unit, and receiver configured to perform the above described method.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2A illustrates a high-level diagram of an orthogonal frequency division multiple access transmit path in accordance with an illustrative embodiment of the present disclosure;

FIG. 2B illustrates a high-level diagram of an orthogonal frequency division multiple access receive path in accordance with an illustrative embodiment of the present disclosure;

FIG. 3 illustrates a block diagram of a transmitter structure for a HARQ-ACK signal in a PUCCH that may be used to implement various embodiments of the present disclosure;

FIG. 4 illustrates a block diagram of a receiver structure for a HARQ-ACK signal in a PUCCH that may be used to implement various embodiments of the present disclosure;

FIG. 5 illustrates a partitioning of an HARQ-ACK Resource Offset (HRO) field in a DL DCI format in a first HRO field and in a second HRO field in accordance with various embodiments of the present disclosure;

FIGS. 6A and 6B illustrate an example of a PUCCH resource compression for HARQ-ACK signaling associated with Enhanced PDCCH (EPDCCH) detections in accordance with an illustrative embodiment of the present disclosure;

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated into the present disclosure as if fully set forth herein: 1) 3GPP TS 36.211 v11.1.0, "E-UTRA, Physical channels and modulation"; 2) 3GPP TS 36.212 v11.1.0, "E-UTRA, Multiplexing and Channel coding"; 3) 3GPP TS 36.213 v11.1.0, "E-UTRA, Physical Layer Procedures"; and 4) 3GPP TS 36.331 v11.1.0. "E-UTRA, Radio Resource Control (RRC) Protocol Specification."

Figure 1:
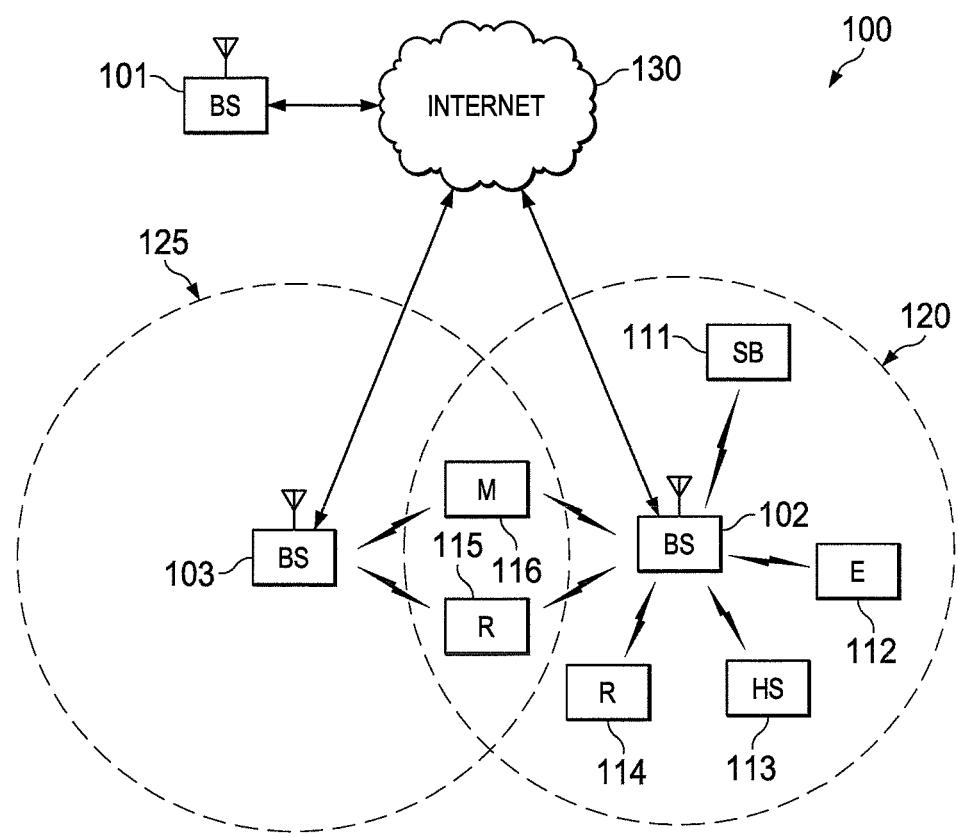
FIG. 1 illustrates an exemplary wireless system which transmits messages in accordance with an illustrative embodiment of the present disclosure.

FIGS. 1-2B below describe various embodiments implemented in wireless communications systems and with the use of OFDM or OFDMA communication techniques. The description of FIGS. 1-2B is not meant to imply physical or architectural limitations to the manner in which different embodiments may be implemented. Different embodiments of the present disclosure may be implemented in any suitably arranged communications system.

FIG. 1 illustrates exemplary wireless system 100, which transmits messages according to the principles of the present disclosure. In the illustrated embodiment, wireless system 100 includes transmission points (e.g., an Evolved Node B (eNB), Node B), such as base station (BS) 101, base station (BS) 102, base station (BS) 103, and other similar base stations or relay stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of UEs (e.g., mobile phone, mobile station, subscriber station) within coverage area 120 of base station 102. The first plurality of UEs includes UE 111, which may be located in a small business (SB); UE 112, which may be located in an enterprise (E); UE 113, which may be located in a WiFi hotspot (HS); UE 114, which may be located in a first residence (R); UE 115, which may be located in a second residence (R); and UE 116, which may be a mobile device (M), such as a cell phone, a wireless laptop, a wireless PDA, or the like.

Base station 103 provides wireless broadband access (via base station 101) to Internet 130 to a second plurality of UEs within coverage area 125 of base station 103. The second plurality of UEs includes UE 115 and UE 116. In an exemplary embodiment, base stations 101-103 may communicate with each other and with UEs 111-116 using OFDM or OFDMA techniques.

While only six UEs are depicted in FIG. 1, it is understood that wireless system 100 may provide wireless broadband access to additional UEs. It is noted that UE 115 and UE 116 are located on the edges of both coverage area 120 and coverage area 125. UE 115 and UE 116 each communicate with both base station 102 and base station 103 and may be said to be operating in handoff mode, as known to those of skill in the art.

UEs 111-116 may access voice, data, video, video conferencing, and/or other broadband services via Internet 130. In an exemplary embodiment, one or more of UEs 111-116 may be associated with an access point (AP) of a WiFi WLAN. UE 116 may be any of a number of mobile devices, including a wireless-enabled laptop computer, personal data assistant, notebook, handheld device, or other wireless-enabled device. UE 114 and 115 may be, for example, a wireless-enabled personal computer (PC), a laptop computer, a gateway, or another device.

FIG. 2A is a high-level diagram of transmit path circuitry 200. For example, the transmit path circuitry 200 may be used for an orthogonal frequency division multiple access (OFDMA) communication. FIG. 2B is a high-level diagram of receive path circuitry 250. For example, the receive path circuitry 250 may be used for an orthogonal frequency division multiple access (OFDMA) communication. In FIGS. 2A and 2B, for downlink communication, the transmit path circuitry 200 may be implemented in base station (BS) 102 or a relay station, and the receive path circuitry 250 may be implemented in a UE (e.g. UE 116 of FIG. 1). In other examples, for uplink communication, the receive path circuitry 250 may be implemented in a base station (e.g., base station 102 of FIG. 1) or a relay station, and the transmit path circuitry 200 may be implemented in a UE (e.g. UE 116 of FIG. 1).

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2A and 2B may be implemented in software, while other components may be implemented by configurable hardware or a mixture of software and configurable hardware. In particular, it is noted that the blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It is appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It is appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path circuitry 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel, and reverse operations to those at BS 102 are performed. Down-converter 255 down-converts the received signal to baseband frequency, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to base stations 101-103 and may implement a receive path corresponding to the architecture for receiving in the downlink from base stations 101-103.

Embodiments of the present disclosure recognize that a HARQ-ACK signal is transmitted in a time transmission interval (TTI) which consists of one subframe that includes two slots. Each slot includes $N_{symb}^{UL}$ symbols for transmitting HARQ-ACK signals or RS which enable coherent demodulation of HARQ-ACK signals. The transmission in the first slot may be at a different part of the operating BW than in the second slot in order to provide frequency diversity. The operating BW consists of frequency resource units which are referred to as Resource Blocks (RBs). Each RB consists of $N_{sc}^{RB}$ sub-carriers, or Resource Elements (REs). A BW unit of 1 RB over a time unit of 1 subframe is referred to as a Physical Resource Block (PRB). A UE transmits HARQ-ACK signals and RS over one PRB 150. HARQ-ACK bits modulate a Zadoff-Chu (ZC) sequence, for example using Binary Phase Shift Keying (BPSK) or Quaternary Phase Shift Keying (QPSK) modulation, which is then transmitted after performing an IFFT. The RS is transmitted through an unmodulated ZC sequence. The transmission in the other slot has effectively a same or similar structure.

FIG. 3 illustrates a block diagram of a transmitter structure 300 for a HARQ-ACK signal in a PUCCH that may be used to implement various embodiments of the present disclosure. In this illustrative embodiment, a ZC sequence is generated in the frequency-domain by ZC sequence generator 310. A first RB and a second RB are selected by controller 320 for transmission using sub-carrier mapper 330 of the ZC sequence in a first slot and in a second slot, respectively, an IFFT is performed at IFFT block 340, and a Cyclic Shift (CS), as is described in greater detail below, is applied by CS mapper 350 which is then filtered by filter 360 and transmitted by antenna(s) 370. For brevity, additional transmitter circuitry such as digital-to-analog converter, analog filters, amplifiers, and transmitter antennas are described above with regard to the transmitter circuitry 200 in FIG. 2A, are not illustrated but may be included in the in transmitter structure 300 illustrated in FIG. 3.

FIG. 4 illustrates a block diagram of a receiver structure 400 for a HARQ-ACK signal in a PUCCH that may be used to implement various embodiments of the present disclosure. In this illustrative embodiment, antenna(s) 410 receive an analog signal and after further processing units (e.g., filters, amplifiers, frequency down-converters, and analog-to-digital converters) a digital received signal is filtered by filter 420, a CS is restored by CS mapper 430, a Fast Fourier Transform (FFT) is applied at FFT block 440, a first RB and a second RB in a first slot and in a second slot, respectively, are demapped by sub-carrier demapper 450 and selected by controller 460, and a signal is correlated by multiplier 470 with a replica of a ZC sequence 480. An output 490 may then be passed to a channel estimation unit, such as a time-frequency interpolator, in case of the RS, or to a detection unit for the transmitted HARQ-ACK bits.

The illustration of transmitter structure 300 and receiver structure 400 in FIGS. 3 and 4 are not meant to imply physical or architectural limitations to the manner in which different embodiments may be implemented. Different embodiments of the present disclosure may be implemented in any suitably arranged communications system.

Embodiments of the present disclosure recognize that different CSs of a ZC sequence provide orthogonal ZC sequences and may be allocated to different UEs to achieve orthogonal multiplexing of respective HARQ-ACK signal transmissions and RS transmissions in a same PRB. Such orthogonal multiplexing may also be achieved in the time domain using Orthogonal Covering Codes (OCC). For example, a HARQ-ACK signal may be modulated by a length-4 OCC, such as a Walsh-Hadamard (WH) OCC, while a RS may be modulated by a length-3 OCC, such as a Dn. OCC (not shown for brevity). In this manner, a multiplexing capacity is increased by a factor of 3 (determined by the OCC with the smaller length). The sets of WH OCCs, $\{W_0, W_1, W_2, W_3\}$, and DFT OCCs, $\{D_0, D_1, D_2\}$, are:

$$\begin{bmatrix} W_0 \\ W_1 \\ W_2 \\ W_3 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix},$$

$$\begin{bmatrix} D_0 \\ D_1 \\ D_2 \end{bmatrix} = \begin{bmatrix} 1 & 1 & 1 \\ 1 & e^{-j2\pi/3} & e^{-j4\pi/3} \\ 1 & e^{-j4\pi/3} & e^{-j2\pi/3} \end{bmatrix}.$$

Table 1 presents an exemplary mapping for a PUCCH resource $n_{PUCCH}$ used for an HARQ-ACK signal transmission to an OCC $n_{oc}$ and a CS $\alpha$ assuming a total of 12 CS per symbol for a ZC sequence. If all resources within a PUCCH PRB are used, resources in an immediately next PRB may be used.

TABLE 1

HARQ-ACK Resource Mapping to OC and CS

| CS α | OCC $n_{oc}$ for HARQ-ACK and for RS | | |
|---|---|---|---|
| | $W_0, D_0$ | $W_1, D_1$ | $W_3, D_2$ |
| 0 | $n_{PUCCH} = 0$ | | $n_{PUCCH} = 12$ |
| 1 | | $n_{PUCCH} = 6$ | |
| 2 | $n_{PUCCH} = 1$ | | $n_{PUCCH} = 13$ |
| 3 | | $n_{PUCCH} = 7$ | |
| 4 | $n_{PUCCH} = 2$ | | $n_{PUCCH} = 14$ |
| 5 | | $n_{PUCCH} = 8$ | |
| 6 | $n_{PUCCH} = 3$ | | $n_{PUCCH} = 15$ |
| 7 | | $n_{PUCCH} = 9$ | |
| 8 | $n_{PUCCH} = 4$ | | $n_{PUCCH} = 16$ |
| 9 | | $n_{PUCCH} = 10$ | |
| 10 | $n_{PUCCH} = 5$ | | $n_{PUCCH} = 17$ |
| 11 | | $n_{PUCCH} = 11$ | |

A PDCCH is transmitted in units referred to as Control Channel Elements (CCEs). Each CCE consists of a number of REs and UEs may derive a total number of CCEs, $N_{CCE}$, in a subframe either through a detection of a Physical Control Format Indicator CHannel (PCFICH) or through RRC signaling from a NodeB. Different types of PDCCH may be simultaneously transmitted in a subframe; a first type is referred to as PDCCH (transmitted in CCEs) and a second type is referred to as EPDCCH (transmitted in ECCEs). An EPDCCH transmission may be in a set of PRBs from one or more sets of PRBs.

In a TDD system, multiple DL subframes may be linked to a single UL subframe. Then, HARQ-ACK transmissions from UEs in response to respective PDSCH receptions in M>1 DL subframes may need to be in a same UL subframe. The number of M>1 DL subframes is referred to as bundling window size. A PUCCH resource $n_{PUCCH}$ for a HARQ-ACK signal transmission, in response to a detection of an EPDCCH in PRB set j and in subframe m, may be determined as in Equation 1 below.

$$n_{PUCCH} = n_{ECCE,m,j} + f(HRO) + \sum_{i=0}^{m-1} N_{ECCE,i,j} + N_{PUCCH,j} \quad \text{Equation 1}$$

In Equation 1, $n_{ECCE,m,j}$ is a lowest ECCE index of an EPDCCH scheduling a respective PDSCH (or SPS release) in subframe m, where $0 \leq m \leq M-1$, and EPDCCH PRB set j, $N_{ECCE,i,j}$ is a total number of ECCEs in EPDCCH PRB set j and in subframe i, and $N_{PUCCH,j}$ is an offset for EPDCCH PRB set j informed to a UE through higher layer signaling by a NodeB. The term $f(HRO)$ denotes a function of an HARQ-ACK Resource Offset (HRO) field, consisting of 2 bits, in a DCI format conveyed by an EPDCCH scheduling a PDSCH (or an SPS release). The term HRO (i.e., HARQ-ACK Resource Offset) may also be referred to as ARO (i.e., Acknowledgment Resource Offset). In the following, such a DCI format is referred to as a DL DCI format and, unless explicitly noted otherwise, an EPDCCH is assumed to schedule a respective PDSCH or a SPS release.

A function of the HRO field is to provide a compression of PUCCH resources for HARQ-ACK signal transmissions which otherwise may consume a substantial portion of a total UL BW particularly if multiple EPDCCH PRB sets exist with each set having a relatively large number of ECCEs. Possible alternatives for a mapping function $f(HRO)$ for a HRO field of 2 bits are:

a) $f(HRO) \in \{-2, -1, 0, 2\}$ b) $f(HRO) \in \{0, 2, -N_{ECCE,i,j}, N_{ECCE,i,j}\}$, $\{0, -N_{ECCE,0,j}, -(N_{ECCE,0,j}+N_{ECCE,1,j}), -(N_{ECCE,0,j}+N_{ECCE,1,j}+N_{ECCE,2,j})\}$ c) $f(HRO) \in \{-2, -1, 0, 2\}$ for i=0, $\{-2, -1, 0, -N_{ECCE,0,j}\}$ for i=1, $\{-1, 0, -N_{ECCE,0,j}, -(N_{ECCE,0,j}+N_{ECCE,1,j})\}$ for i=2, and $\{0, -N_{ECCE,0,j}, -(N_{ECCE,0,j}+N_{ECCE,1,j}), -(N_{ECCE,0,j}+N_{ECCE,1,j}+N_{ECCE,2,j})\}$ for i=3.

Additional alternatives exist and may be implemented in accordance with the principles of the present disclosure.

A drawback of the first alternative is that it does not avoid an expansion of PUCCH resources with a number of DL subframes in a bundling window as it does not offset the term $$\sum_{i=0}^{m-1} N_{ECCE,i,j}$$

in Equation 1. A drawback of the second alternative is that this second alternative may require that PUCCH resources corresponding to different EPDCCH PRB sets in a same DL subframe be non-overlapping as this second alternative does not provide means to avoid collisions in case a first EPDCCH transmitted in a first PRB set and a second EPDCCH transmitted in a second PRB set use a same lowest ECCE index. A drawback of the third alternative is that for the larger values of i, e.g. for i=3, it has the same drawback as the second alternative. Additional drawbacks of the above three alternatives exist as will subsequently become evident in accordance with the principles of the present disclosure.

Accordingly, embodiments of the present disclosure recognize that there is a need to define a method to compress PUCCH resources for HARQ-ACK signaling and to define an associated function of an HRO field in respective DL DCI formats in a TDD system. Embodiments of the present disclosure recognize also that is a need to define a HRO field in a DL DCI format in order to achieve PUCCH resource compression of HARQ-ACK signaling in TDD systems. Embodiments of the present disclosure recognize further recognize that there is a need to compress PUCCH resources for HARQ-ACK signaling from UEs configured to monitor multiple types of physical DL control channels in DL subframes of a bundling window. Accordingly, embodiments of the present disclosure provide resource overhead reduction for transmission of acknowledgment signals.

In various embodiments the present disclosure provides a method and corresponding system for PUCCH resource compression of HARQ-ACK signaling in a TDD system. Embodiments the present disclosure recognize that a compression of PUCCH resources only in the ECCE domain, by a NodeB configuring overlapping PUCCH resources for different EPDCCH PRB sets in a subframe of a bundling window by configuring same value of $N_{PUCCH,j}^{(1)}$ for each set j, cannot compress PUCCH resources in the time domain which grow linearly with the term $$\sum_{i=0}^{m-1} N_{ECCE,i,j}$$

in Equation 1 above. Embodiments the present disclosure also recognize that compression of PUCCH resources only in the time domain, across subframes in a bundling window, may also be ineffective as, due to an inability to avoid collisions among PUCCH resources for different EPDCCH PRB sets per subframe, a NodeB has to configure PUCCH resources associated with different EPDCCH PRB sets to be non-overlapping across an entire bundling window. For example, for 2 EPDCCH PRB sets, a NodeB needs to configure a PUCCH resource offset $N_{PUCCH,1}^{(1)}$ for a second EPDCCH PRB set such that it is larger by a factor of $$\sum_{i=0}^{m-1} N_{ECCE,i,0}$$

relative to a PUCCH resource offset $N_{PUCCH,0}^{(1)}$ for a first EPDCCH PRB set, that is $$N_{PUCCH,1}^{(1)} = \sum_{i=0}^{m-1} N_{ECCE,i,0} + N_{PUCCH,0}^{(1)}.$$

Then, in addition to using non-overlapping PUCCH resources for different EPDCCH PRB sets, PUCCH resource compression may be ineffective as, even when the compression may be achieved, this compression may cause UL BW fragmentation between the last PUCCH resource corresponding to the first EPDCCH PRB set and the first PUCCH resource corresponding to the second EPDCCH PRB set. For more than 2 EPDCCH PRB sets, multiple UL BW fragmentations may occur.

Due to the above shortcomings of existing solutions, the various embodiments of the present disclosure provide a 2-dimensional determination of a PUCCH resource for HARQ-ACK signaling from a UE in response to an EPDCCH detection in a TDD system. A first dimension is the EPDCCH PRB set (or a set of respective ECCEs) as multiple EPDCCH PRB sets may be configured for UEs to monitor in a subframe (e.g., the PUCCH resources corresponding to ECCEs of different EPDCCH sets in a same subframe). A second dimension is the DL subframe in a bundling window (e.g., the PUCCH resources corresponding to ECCEs of a same EPDCCH set in different subframes). Therefore, in order to maximize PUCCH resource compression for HARQ-ACK signaling in a TDD system, a 2-dimensional compression is needed in the ECCE domain per subframe (associated with the EPDCCH PRB set per subframe) and in the time domain (associated with the DL subframes in a bundling window). Embodiments of the present disclosure provide 2-dimensional PUCCH resource compression using values of the HRO field. By denoting by m the subframe index in a bundling window of size M (m=0, 1, . . . M-1), and for an HRO field of 2 bits mapping to 4 respective values, the present disclosure provides that 1) the mapping of the HRO field depends on the value of the subframe index m; 2) up to 2 values may be used to compress PUCCH resources in the time domain and at least 2 values may be used to compress PUCCH resources in the ECCE domain (depending on the value of m); and 3) the up to 2 values that compress PUCCH resources in the time domain are "large" negative values that cancel an PUCCH resource accumulation that occurred in a previous subframe in a same bundling window.

To achieve a 2-dimensional PUCCH resource compression, various embodiments of the present disclosure assume that a HRO field in a DL DCI format conveyed by an EPDCCH in a subframe of a bundling window consists of a first HRO field, HRO1, performing PUCCH resource compression for HARQ-ACK signaling in the ECCE domain and of a second HRO field, HRO2, performing PUCCH resource compression for HARQ-ACK signaling in the time domain. Therefore, instead of having a single ƒ(HRO) function, there is a first $f_1$(HRO1) function used for PUCCH resource compression for HARQ-ACK signaling in the ECCE domain (for a given subframe) and a second $f_2$(HRO2) function used for PUCCH resource compression for HARQ-ACK signaling in the time domain (for a given EPDCCH set), as described in Equation 2 below.

$$f(HRO)=f_1(HRO_1)+f_2(HRO_2) \qquad \text{Equation 2}$$

FIG. 5 illustrates a partitioning of an HRO field in a DL DCI format in a first HRO field and in a second HRO field in accordance with various embodiments of the present disclosure. In this illustrative embodiment, a NodeB (e.g., BS 102) transmits a first DL DCI format to a first UE (e.g., UE 111) using a first EPDCCH in a first set of PRBs and in a first subframe where the first DL DCI format includes a HRO field 510 which is represented by Q bits where a first $Q_1$ bits provide HRO1 and a second $Q_2$ bits provide HRO2. The $Q_1$ bits of the HRO1 field 520 may indicate small values. Using such a value, the NodeB may avoid a same PUCCH resource to be used for HARQ-ACK signaling by the first UE and by at least one other second UE (e.g., UE 112) that the NodeB transmits a second DCI format using a second EPDCCH in a second set of PRBs and in a second subframe (i.e., PUCCH resource collision avoidance 530). For example, for $Q_1$=2, a PUCCH resource for HARQ-ACK signaling may be determined as in Equation 1 and Equation 2 and $f$(HRO1)∈{-2, -1, 0, 2}. The second subframe is in a same bundling window as the first subframe and occurs at the same time or at an earlier time than the first subframe. If the second subframe occurs at the same time as the first subframe, all other said first values and said second values are respectively different. If the second subframe occurs at a different time than the first subframe, all other said first values and said second values may respectively be same or different.

The $Q_2$ bits of the HRO2 field 540 may include large negative values. Using such a value, the NodeB may compress the PUCCH resources used for HARQ-ACK signaling by the first UE in later subframes of a bundling window so that they overlap with respective ones used in earlier subframes of the bundling window (i.e., PUCCH resource compression 550). For example, for $Q_2$=2, EPDCCH PRB set j and a fourth subframe of a bundling window, $f$(HRO2$_j$)∈{0, $-N_{ECCE,0,j}$, $-(N_{ECCE,0,j}+N_{ECCE,1,j})$, $-(N_{ECCE,0,j}+N_{ECCE,1,j}+N_{ECCE,2,j})$}. Dividing Q bits into first $Q_1$ bits and second $Q_2$ bits is equivalent to having the Q bits represent all values resulting from the $Q_1$ bits and the $Q_2$ bits.

The partitioning of Q bits of an HRO field to $Q_1$ bits of a HRO1 field indicating a first set of small values and to $Q_2$ bits of a HRO2 field indicating a second set that may include large negative values may also depend on a EPDCCH PRB set j (determines a total number of respective ECCEs in a subframe) and on subframe i. Therefore, $Q_1$=$Q_{1,i,j}$ and $Q_2$=$Q_{2,i,j}$. For example, for a subframe with index i=0 in a bundling window (e.g., a first PUCCH subframe), a possible partitioning is $Q_{1,0,j}$=Q and $Q_{2,0,j}$=0 as there is no compression of PUCCH resources in the time domain. Conversely, for a subframe with index i=3 in a bundling window (e.g., a second or later PUCCH subframe), a possible partitioning is $Q_{1,3,j}$=1 and $Q_{2,3,j}$=Q-1 (for Q>1) or $Q_{1,3,j}$=2 and $Q_{2,3,j}$=Q-2 (for Q>2). As a number of $Q_{1,i,j}$ and a number of $Q_{2,i,j}$ may vary with i, so may each respective mapping. For example, $f_1$($Q_{1,0,j}$)∈{-4, -3, -2, -1, 0, 1, 2, 3} for i=0 and $f_1$($Q_{1,i,j}$)∈{-2, -1, 0, 2} for i>0. Similar, for $Q_{2,i,j}$=1 and for all i>0, a possible mapping may be $f_2$($Q_{2,1,j}$)∈{0, $-N_{ECCE,0,j}$} and $f_2$($Q_{2,3,j}$)=$f_2$($Q_{2,3,j}$)∈{0, $-(N_{ECCE,0,j}+N_{ECCE,1,j})$}.

Figure 6A:
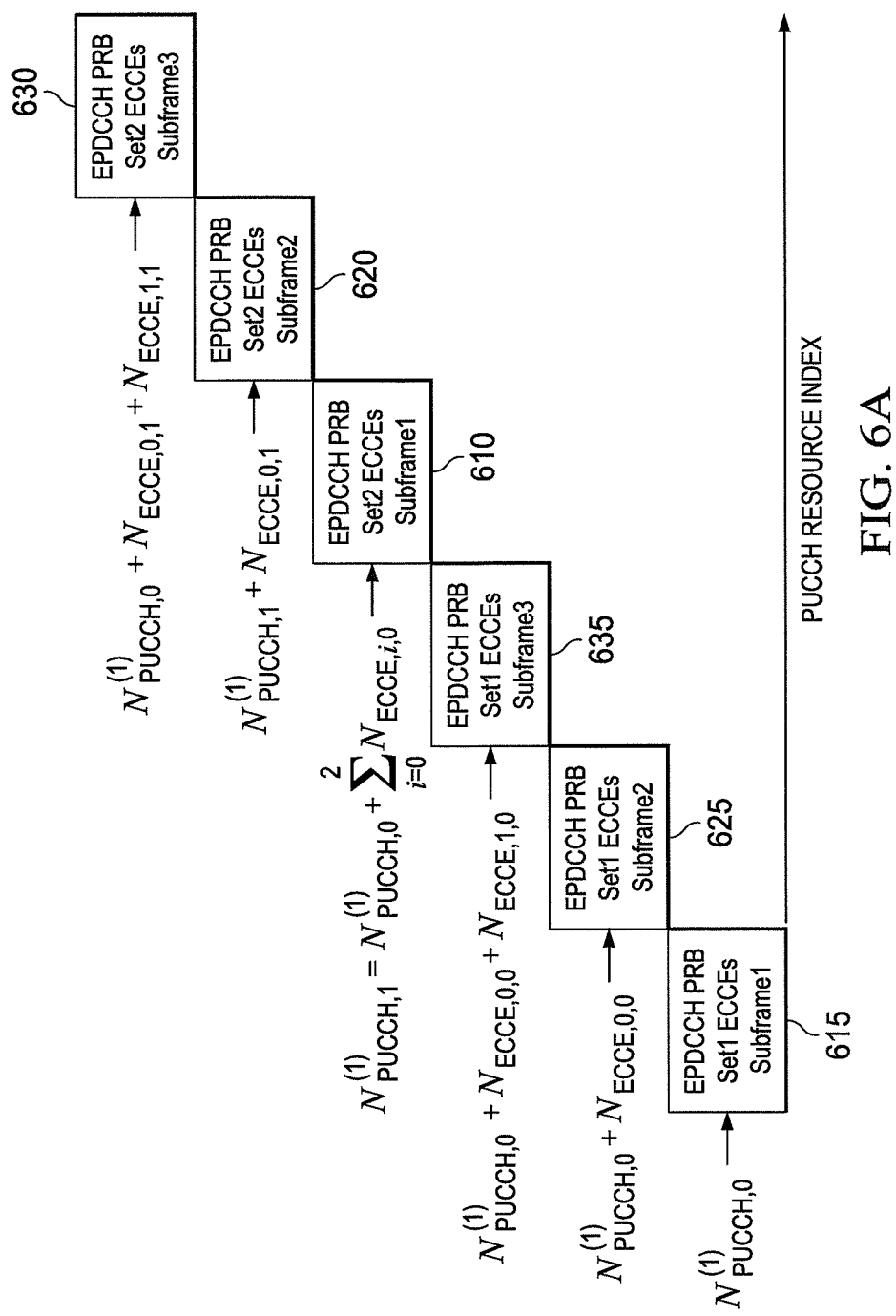

FIGS. 6A and 6B illustrate an example of PUCCH resource compression for HARQ-ACK signaling associated with EPDCCH detections in accordance with an illustrative embodiment of the present disclosure. In this illustrative example, HARQ-ACK signaling associated with EPDCCH detections without PUCCH resource compression is illustrated in FIG. 6A and resource savings for HARQ-ACK signaling associated with EPDCCH detections with PUCCH resource compression is illustrated in FIG. 6B. In this example, the EPDCCH transmission includes for 2 EPDCCH PRB sets and has a bundling window size of M=3 subframes.

As illustrated in FIG. 6A, if a PUCCH resource in response to an EPDCCH detection is determined as in Equation 1 but without the presence of $f$(HRO), PUCCH resource compression cannot be applied if scheduling restrictions in using ECCEs are to be avoided in order to respectively avoid PUCCH resource collisions. Then, for a second EPDCCH PRB set, a NodeB configures a PUCCH resource offset $N_{PUCCH,1}^{(1)}$ so that a first PUCCH resource associated with the second EPDCCH PRB set occurs after a maximum of $$\sum_{i=0}^{2} N_{ECCE,i,0}$$

PUCCH resources associated with a first EPDCCH PRB set and $$N_{PUCCH,1}^{(1)} = N_{PUCCH,0}^{(1)} + \sum_{i=0}^{2} N_{ECCE,i,0} \; 610.$$

A first PUCCH resource associated with the first EPDCCH PRB set may be indicated to a UE by a configuration from the NodeB of a PUCCH resource offset $N_{PUCCH,0}^{(1)}$ 615. Similarly, first PUCCH resources associated with a second subframe in a bundling window for the second EPDCCH PRB set and for the first EPDCCH PRB set are respectively determined as $N_{PUCCH}^{(1)}+N_{ECCE,0,1}$ 620 and as $N_{PUCCH,0}^{(1)}+N_{ECCE,0,0}$ 625. Finally, first PUCCH resources associated with a third subframe in a bundling window for the second EPDCCH PRB set and for the first EPDCCH PRB set are respectively determined as $N_{PUCCH,1}^{(1)}+N_{ECCE,0,1}+N_{ECCE,1,1}$ 630 and as $N_{PUCCH,0}^{(1)}+N_{ECCE,0,0}+N_{ECCE,1,0}$ 635.

As illustrated in FIG. 6B, if a PUCCH resource in response to an EPDCCH detection is determined as in Equation 1 and Equation 2, PUCCH resources corresponding to a first EPDCCH PRB set and to a second EPDCCH PRB set may overlap across EPDCCH PRB sets or across subframes in a bundling window. Although the depicted overlap is complete across EPDCCH PRB sets and across their respective ECCEs (the EPDCCH PRB sets are assumed to have a same size and therefore a same number of ECCEs in a subframe) and partial across subframes in the bundling window, it may be either partial or complete in any of these two domains. Within PUCCH resources corresponding to ECCEs in different EPDCCH PRB sets in a same subframe, subframe 640, 642, or 644, collisions are avoided using $f_1(Q_{1,i,j})$. Within PUCCH resources corresponding to ECCEs in different subframes of a same EPDCCH PRB set, set 650, 652, or 654, compression is achieved using $f_2(Q_{1,i,j})$. As illustrated, subframe 640 is first in time (i.e., m=0) among the bundled subframes 640, 642, or 644. Therefore, collision avoidance only needs to take into consideration collisions between the different EPDCCH PRB sets (e.g., EPDCCH PRB set1 and EPDCCH PRB set2) and practice collision avoidance in the EPDCCH PRB set domain. However, subframes 642 and 644 are not first in time (i.e., m>0 or i>0) among the bundled subframes 640, 642, or 644. Therefore, collision avoidance for subframes 642 and 644 needs to take into consideration both collisions between the different EPDCCH PRB sets (e.g., EPDCCH PRB set1 and EPDCCH PRB set2) and different subframes (e.g., ECCEs subframe1 or ECCEs subframe1&2, respectively) and practice collision avoidance in both the EPDCCH PRB set and subframe (i.e., time) domains.

The illustration of the PUCCH resource compression for HARQ-ACK signaling associated with EPDCCH detections in FIGS. 6A and 6B is for illustration of the principles of the present disclosure and not intended as a limitation on the various embodiments that may be implemented in accordance with the principles of the present disclosure. For example, any number of different bundling window sizes and any number of different EPDCCH PRB sets may be used.

Various embodiments of the present disclosure provide a construction of a HRO field in a DL DCI format conveyed by an EPDCCH in a TDD system. In one illustrative example, a HRO field in a DL DCI format conveyed by an EPDCCH in a TDD system has a same number of bits as a HRO field in a DL DCI format conveyed by an EPDCCH in a FDD system (in FDD, there is no and $Q_{2,i,j}$ and $Q=Q_{1,i,j}$). For example, in both TDD and FDD systems, a HRO field consists of Q=2 bits. Then, in FDD and in a first subframe (i.e., i=0) of a bundling window in TDD where, similar to FDD, there is no $Q_{2,0,j}$ and $f(Q)=f_1(Q_{1,i,j})\in\{2, 1, 0, 2\}$. In all subframes of a bundling window with index i>0 in TDD, $Q_{1,i,j}=1$ and $Q_{2,i,j}=1$ with $f_1(Q_{1,i,j})$ being same for all i>0, for example $f_1(Q_{1,i,j})\in\{0,2\}$, and $f_2(Q_{2,i,j})$ depending on the subframe index i. For example, $f_2(Q_{2,i,j})\in\{0, -N_{ECCE,0,j}\}$ for i=1, $f_2(Q_{2,i,j})\in\{-N_{ECCE,0,j},-(N_{ECCE,0,j}+N_{ECCE,1,j})\}$ for i=2, and $f_2(Q_{2,i,j})\in\{-N_{ECCE,0,j}+N_{ECCE,1,j},-(N_{ECCE,0,j}+N_{ECCE,1,j}+N_{ECCE,2,j})\}$ for i=3, or $f_2(Q_{2,i,j})\in\{-N_{ECCE,0,j}-1,-N_{ECCE,0,j}-2\}$ for i=1, $f_2(Q_{2,i,j})\in\{-N_{ECCE,1,j}-1,-(N_{ECCE,0,j}+N_{ECCE,1,j})-2\}$ for i=2, and $f_2(Q_{2,i,j})\in\{-N_{ECCE,2,j}-1,-(N_{ECCE,0,j}+N_{ECCE,1,j}+N_{ECCE,2,j})-2\}$ for i=3, and so on.

In another example, a HRO field in a DL DCI format in a TDD system has a larger number of bits than a HRO field in a DL DCI format in a FDD system. For example, in FDD systems a HRO field consists of Q=2 bits while in a TDD system a HRO field consists of Q>2 bits, at least when a bundling window size is M>1. The number of bits of a HRO field in a TDD system may either depend on the value of M or be same for all values of M>1. For example, Q=3 for all M>1 or Q=3 for M=2 and Q=4 for M=3 or M=4.

Considering Q=2 HRO bits for a FDD system, the additional HRO bits for a TDD system may be provided either by additional bits in respective DCI formats or by re-interpreting existing bits in respective DCI formats. For example, DL DCI formats include a DL Assignment Index (DAI) field consisting of 2 bits and indicating the number of the DL DCI format a NodeB transmits to a UE in a subframe of a bundling window. The value of the DAI field is 1 if the DL DCI format is a first one a NodeB transmits to the UE, the value is 2 if the DL DCI format is a second one a NodeB transmits to the UE, and so on. For M=2, a 1 bit of the DAI field suffices for its intended purpose and the other bit may be used to increase a number of HRO bits by 1.

Various embodiments of the present disclosure provide PUCCH resource compression of HARQ-ACK signaling in TDD systems for a UE configured to monitor multiple types of PDCCHs in subframes of a bundling window. In one illustrative example, a first type of PDCCH may be transmitted over a first number of subframe symbols and over an entire operating DL BW, while a second type of PDCCH (EPD- CCH) may be transmitted over a second number of subframe symbols and only over a number of PRBs that is smaller than a number of PRBs consisting an entire operating DL BW. In a TDD system, a UE may be configured by a NodeB to monitor PDCCH in some subframes of a bundling window and monitor EPDCCH in remaining subframes of a bundling window. Moreover, a UE may use a first method to determine PUCCH resources for HARQ-ACK signaling in response to a PDCCH detection and use a second method to determine PUCCH resources for HARQ-ACK signaling in response to an EPDCCH detection. In one example, such a method for EPDCCH may be used according to the discussion of Equation 1 above. In another example such methods may be assumed to not be identical for PDCCH and EPDCCH and result to a use by a UE of different PUCCH resources depending on whether the UE detects a PDCCH or an EPDCCH.

In principle, a UE should use PUCCH resources corresponding to PDCCH detections in subframes the UE does not monitor EPDCCH (and vice versa). However, subframes where a UE monitors EPDCCH are configured to the UE by a NodeB in a UE-specific manner (although UE-common subframes for either EPDCCH or PDCCH monitoring may also exist).

In FDD, with a use of a HRO field in DL DCI formats, a network may configure (at least partially) overlapped PUCCH resources in response to PDCCH detections or EPDCCH detections. Then, a UE may use PUCCH resources associated with ECCEs in subframes the UE monitors PDCCH (and vice versa). In TDD, a PUCCH resource misalignment may occur if different UEs use different accumulations for $$\sum_{i=0}^{m-1} N_{ECCE,i,j}$$

to determine a respective PUCCH resource corresponding to respective EPDCCH detections in a same subframe (as in Equation 1 above). Then, even with a use of a HRO, scheduler restrictions are needed as a NodeB may not know future scheduling decisions when effectively assigning PUCCH resources through a selection of CCEs or ECCEs and a value of a HRO field in a subframe.

If a UE discounts PUCCH resources corresponding to EPDCCH PRB sets in subframes the UE monitors PDCCH, this monitoring means that for a bundling window having a subframe with index $i_0$ where a first UE monitors PDCCH and a second UE monitors EPDCCH, the first UE does not include the term $N_{ECCE,i_0,j}$ in $$\sum_{i=0}^{m-1} N_{ECCE,i,j}$$

and the second UE does, where $0 \leq i_0 < M-1$. Either scheduling restrictions may need to occur or the NodeB is implicitly forced to use UE-common configuration of EPDCCH monitoring subframes in order to avoid collisions of associated PUCCH resources. As neither of the two alternatives/restrictions is desirable, the present disclosure provides that a NodeB may configure a UE through higher layer signaling, such as RRC signaling, whether to include PUCCH resources associated with the EPDCCH PRB sets configured to the UE in subframes the UE is also configured to monitor PDCCH.

Figure 7:
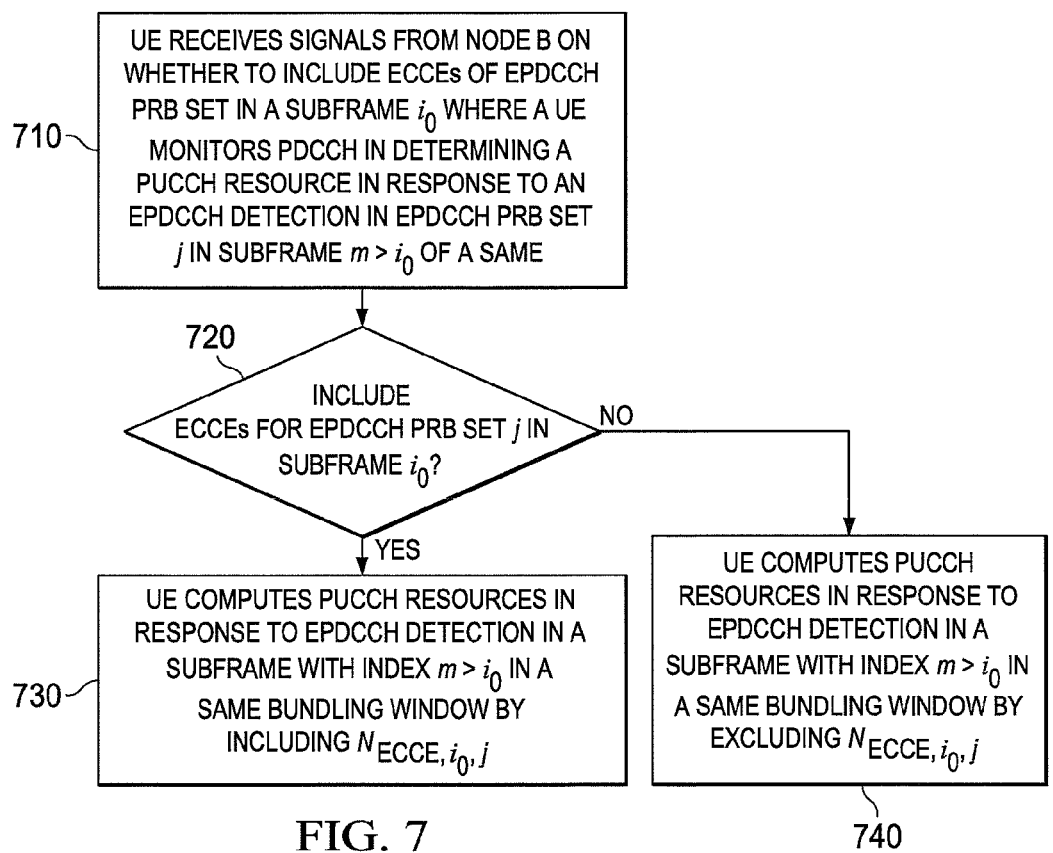
FIG. 7 illustrates a flowchart of a process for determining a PUCCH resource in a Time Division Duplex (TDD) system depending on a NodeB configuration in accordance with various embodiments of the present disclosure.

FIG. 7 illustrates a flowchart of a process for determining a PUCCH resource in a TDD system depending on a NodeB configuration in accordance with various embodiments of the present disclosure. For example, the process depicted in FIG. 7 may be performed by the transmitter 300 in FIG. 3. The process may also be implemented by the UE 111 in FIG. 1.

In this illustrative example, a UE receives signals from a NodeB, for example using RRC signaling, whether to include ECCEs of EPDCCH PRB set j in a subframe $i_0$ where the UE monitors PDCCH in determining a PUCCH resource in response to an EPDCCH detection in EPDCCH PRB set j in subframe $m > i_0$ of a same bundling window (step 710). For example, as part of step 710, in one approach, the NodeB signaling may consist of a single binary element and be applicable to all subframes of a bundling window a UE is configured to monitor PDCCH. In another example, the NodeB signaling may be same as a signaling configuring to a UE the subframes to monitor PDCCH and may indicate, using a binary value of 0 or 1, whether ECCEs for EPDCCH PRB sets in a subframe configured to the UE for PDCCH monitoring should be included or excluded, respectively, from determining a PUCCH resource in response to an EPDCCH detection in a subsequent subframe of a same bundling window. In either of the above two examples, for subframes known to all UEs as not conveying EPDCCH for any UE, the ECCEs of any EPDCCH PRB set are excluded from determining a PUCCH resource in response to an EPDCCH detection in a subsequent subframe of a same bundling window.

Thereafter, the UE determines whether, for PUCCH resource determination in response to EPDCCH detection in subframe $m > i_0$, the signaling from the NodeB indicates inclusion of ECCEs of EPDCCH PRB set j in subframe $i_0$ where the UE is configured to monitor PDCCH (step 720). If so, the UE determines a PUCCH resource using the term $$\sum_{i=0}^{m-1} N_{ECCE,i,j}$$

as in Equation 1 (step 730). If the UE does not determine that the signaling from the NodeB does not indicate inclusion of ECCEs of EPDCCH PRB set j in subframe $i_0$, the UE determines a PUCCH resource using the term $$\sum_{\substack{i=0 \\ i \neq i_0}}^{m-1} N_{ECCE,i,j}$$

as in Equation 1 where $N_{ECCE,i_0,j}$ is excluded from a summation of a total number of ECCEs in EPDCCH PRB set j in subframes prior to subframe m in a same bundling window (step 740). Although FIG. 7 illustrates an example of a process for determining a PUCCH resource in a TDD system depending on a NodeB configuration, various changes could be made to FIG. 7. For example, while shown as a series of steps, various steps in each figure could overlap, occur in parallel, occur in a different order, or occur multiple times.

A UE may also monitor different types of EPDCCH in a subframe. One such type is a distributed EPDCCH for which the ECCEs are sequentially numbered and distributed across PRBs of a respective EPDCCH PRB set. If not all ECCEs of a distributed EPDCCH PRB set are used in a subframe, the unused ECCEs may be ones with larger indexes. Therefore, an overhead for the respective PUCCH resources is not unnecessarily increased as, for example according to Equation 1, using smaller values for a lowest ECCE index of an EPDCCH will also result to smaller values of a PUCCH resource for a respective transmission of a HARQ-ACK signal. This property of the distributed EPDCCH type is not maintained for another EPDCCH type which is referred to as localized EPDCCH and for which the ECCEs of a localized EPDCCH PRB set are first indexed within a PRB and then across PRBs. As a consequence, if a localized EPDCCH is transmitted in a PRB with high index, a PUCCH resource for a respective transmission of a HARQ-ACK signal also has a high index value. This may result in unnecessary overhead for PUCCH resources such as, for example, a large number of PUCCH resources being reserved even when only a single EPDCCH transmitted in a PRB with high index requires a respective HARQ-ACK signal transmission.

Accordingly, to compress the PUCCH overhead associated with HARQ-ACK signal transmissions in response to respective localized EPDCCH detections, the embodiments of the present disclosure provide that an indexing of ECCEs used for a search space determination for a localized EPDCCH transmission at a UE is modified (e.g., permuted) for a determination of a respective PUCCH resource. For a given subframe, a UE may identify an ECCE index for a PUCCH resource determination corresponding to an ECCE index for a respective EPDCCH transmission based on a permutation of ECCE indexes of a localized EPDCCH PRB set for indexing respective PUCCH resources for HARQ-ACK signal transmissions. In one example, denoting by $n_{ECCE}$ an ECCE index for a localized EPDCCH PRB set, by $N_{ECCE\_PRB}$ a number of ECCEs per PRB, and by $N_{PRB}$ a number of PRBs in the localized EPDCCH PRB set, a UE may compute an ECCE index (i.e., $n_{ECCE\_PUCCH}$) for a PUCCH resource determination corresponding to an ECCE index for a respective EPDCCH according to Equation 3 below:

$$n_{ECCE\_PUCCH} = \lfloor n_{ECCE}/N_{ECCE\_PRB} \rfloor + (n_{ECCE} \bmod N_{ECCE\_PRB}) \cdot N_{PRB} \quad \text{Equation 3}$$

where $\lfloor \ \rfloor$ is a "floor" function that rounds a number to its lower integer and "mod" is the modulo function. The $n_{ECCE\_PUCCH}$ index derived from the lowest $n_{ECCE}$ index of a localized EPDCCH is used to replace the lowest $n_{ECCE}$ index in determining a PUCCH resource for a respective HARQ-ACK signal transmission (for example, as in Equation 1).

Figure 8:
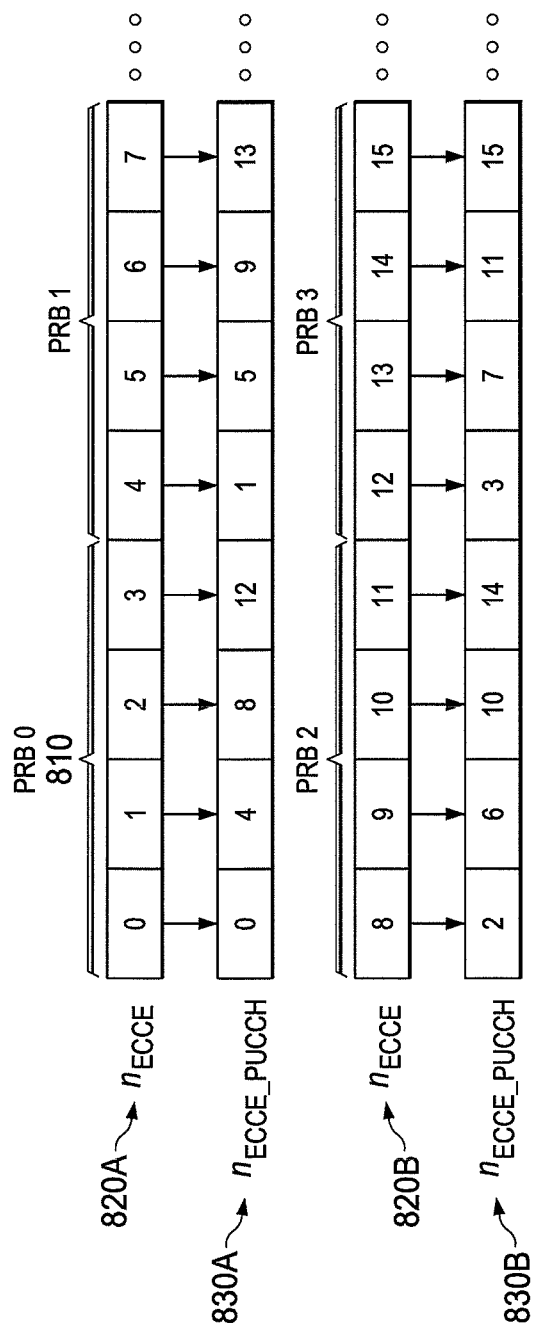
FIG. 8 illustrates a permutation of enhanced common control element (ECCE) indexes of a localized EPDCCH PRB set for indexing respective PUCCH resources for HARQ-ACK signal transmissions in accordance with an illustrative embodiment of the present disclosure.

FIG. 8 illustrates an example permutation of ECCE indexes of a localized EPDCCH PRB set for indexing respective PUCCH resources for HARQ-ACK signal transmissions in accordance with an illustrative embodiment of the present disclosure. In this illustrative example, a localized EPDCCH PRB set consists of $N_{PRB}=4$ PRBs and each PRB consists of $N_{ECCE\_PRB}=4$ ECCEs 810. The ECCEs for a determination of a search space where a UE may perform detections for potential EPDCCHs in a subframe are indexed sequentially $n_{ECCE}$ within each PRB starting with a PRB with a lowest index 820A and 820B. The ECCEs for a determination of a PUCCH resource for a HARQ-ACK signal transmission in response to an EPDCCH detection are indexed based on a permutation of the $n_{ECCE}$ indexes as described in Equation 3 to obtain $n_{ECCE\_PUCCH}$ 830A and 830B. Subsequently, the $n_{ECCE\_PUCCH}$ associated with the lowest ECCE index $n_{ECCE}$, replaces the lowest ECCE index $n_{ECCE}$ in a respective formula for a determination of a PUCCH resource for HARQ-ACK signal transmission.

The illustration of the permutation of ECCE indexes of a localized EPDCCH PRB set for indexing respective PUCCH resources for HARQ-ACK signal transmissions in FIG. 8 is for illustration of the principles of the present disclosure and not intended as a limitation on the various embodiments that may be implemented in accordance with the principles of the present disclosure.

Figure 9:
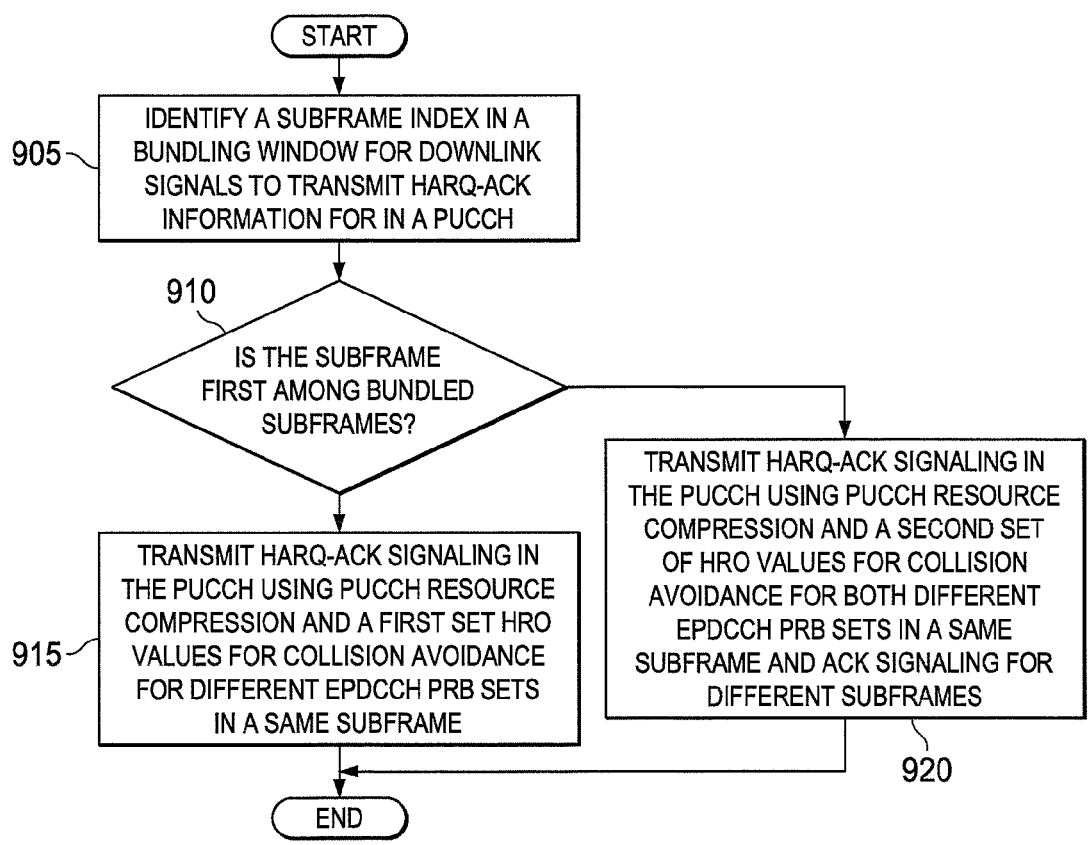
FIG. 9 illustrates a process for reducing resource overhead for transmission of HARQ-ACK signals in accordance with various embodiments of the present disclosure.

FIG. 9 illustrates a process for reducing resource overhead for transmission of HARQ-ACK signals in accordance with various embodiments of the present disclosure. For example, the process depicted in FIG. 9 may be performed by the transmitter 300 in FIG. 3. The process may also be implemented by the UE 111 in FIG. 1.

The process begins by identifying a subframe index in a bundling window for downlink signals to transmit HARQ-ACK information for in a PUCCH (step 905). For example, in step 905, the subframe index is an index of which subframe among bundled subframes HARQ-ACK information needs to be transmitted.

Thereafter, the process determines whether the subframe index indicates that a first subframe among bundled subframes (step 910). For example, in step 910, the UE may determine the subframe index is m=0. If the subframe index indicates a first subframe among bundled subframes, the process transmits HARQ-ACK signaling in the PUCCH using PUCCH resource compression and a first set HRO values for collision avoidance for different EPDCCH PRB sets in a same subframe (step 915). For example, in step 915, the UE may perform compression of PUCCH resources in both time and EPDCCH PRB set domains while using collision avoidance for HARQ-ACK signaling for different EPDCCH PRB sets in a same subframe. The UE may perform the PUCCH compression of by using common PUCCH resources for HARQ-ACK signaling of different EPDCCH PRB sets in a same subframe and for HARQ-ACK signaling of a same EPDCCH PRB set in different subframes.

If the subframe index indicates a second or greater subframe among bundled subframes, the process transmits HARQ-ACK signaling in the PUCCH using PUCCH resource compression and a second set of HRO values for collision avoidance for both different EPDCCH PRB sets in a same subframe and HARQ-ACK signaling for different subframes (step 920). For example, in step 920, the UE may perform compression of PUCCH resources in both time and EPDCCH PRB set domains while using collision avoidance for HARQ-ACK signaling for both different EPDCCH PRB sets in a same subframe and HARQ-ACK signaling for different subframes. The UE may perform the PUCCH compression of by using common PUCCH resources for HARQ-ACK signaling of different EPDCCH PRB sets in a same subframe and for HARQ-ACK signaling of a same EPDCCH PRB set in different subframes.

Although FIG. 9 illustrates an example of a process for reducing resource overhead for transmission of HARQ-ACK signals, various changes could be made to FIG. 9. For example, while shown as a series of steps, various steps in each figure could overlap, occur in parallel, occur in a different order, or occur multiple times.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A method of operating a User Equipment (UE) to transmit a Hybrid Automatic Repeat reQuest Acknowledgment (HARQ-ACK) signal in a Physical Uplink Control CHannel (PUCCH), the method comprising:
    detecting each Physical Downlink Control CHannel (PD-CCH) of one or more PDCCHs of a first type transmitted from a base station over respective one or more Trans- mission Time Interval (TTIs) within a total number of M TTIs and within a set j of Physical Resource Block (PRB) pairs, wherein a PRB pair includes a number of sub-carriers over a TTI, and wherein each PDCCH is detected over a respective number of Control Channel Elements (CCEs) and conveys a Downlink Control Information (DCI) format that includes a HARQ-ACK Resource Offset (HRO) information field having Q binary elements;

determining a PUCCH resource $n_{PUCCH}$ in response to a PDCCH detection in TTI m, $0 \leq m \leq M-1$, as $$n_{PUCCH} = n_{CCE,m,j} + f(HRO) + \sum_{i=0}^{m-1} N_{CCE,i,j} + N_{PUCCH,j},$$

wherein $n_{CCE,m,j}$ is an index for a first CCE of the PDCCH in TTI m, $f(HRO)$ is a mapping function for the HRO information field having an even number of integer outputs, $N_{CCE,i,j}$ is a total number of CCEs in TTI i, and $N_{PUCCH,j}$ is informed to the UE from the base station by higher layer signaling, and wherein for m=0 all $f(HRO)$ values are small integers and for m>0 a first even number of $f(HRO)$ values are same as for m=0 and do not depend on a value of m and a remaining second even number of $f(HRO)$ values are larger negative integers that depend on the value of m and include a term that is a sum of one or more $-N_{CCE,i,j}$ values where $0 \leq i \leq m-1$; and transmitting the HARQ-ACK signal in the determined PUCCH resource.

2. The method of claim 1, wherein Q=2, the first even number of $f(HRO)$ values is two, and the remaining second even number of $f(HRO)$ values is two with a first value including a term $$-\sum_{i=0}^{m-1} N_{CCE,i,j}.$$

3. The method of claim 2, wherein a second value of the remaining second even number of $f(HRO)$ values includes a term $-N_{CCE,m-1,j}$.

4. The method of claim 1, wherein for m=0 the $f(HRO)$ values are $\{-2, -1, 0, 2\}$.

5. The method of claim 1, wherein a first value of Q is associated with a first value of M and a second value of Q is associated with a second value of M, wherein the first value of Q is smaller than the second value of Q and the first value of M is smaller than the second value of M.

6. The method of claim 1, wherein the DCI format includes a Downlink Assignment Index (DAI) field, the DAI field at TTI m indicating a total number of DCI formats transmitted to the UE from TTI 0 until TTI m and wherein, for at least some values of m, at least one binary element from the DAI field is used as a binary element of the HRO field.

7. The method of claim 1, wherein the UE detects a PDCCH of a second type in TTI $m_1$, $0 \leq m_1 \leq m-1$ and m>0.

8. The method of claim 1, wherein the PDCCH is transmitted within one PRB pair and $n_{CCE,m,j}$ is replaced by:

$$n_{CCE,m,j}^L = \lfloor n_{CCE,m,j}/N_{CCE\_PRB,m,j} \rfloor + (n_{CCE,m,j} \bmod N_{CCE\_PRB,m,j}) \cdot N_{PRB,j}$$

where $N_{CCE\_PRB,m,j}$ is a number of CCEs within a PRB pair, $N_{PRB,j}$ is a total number of PRB pairs in the set j of PRB pairs, and $\lfloor \ \rfloor$ is a floor function that rounds a number to a next integer that is less than or equal to the number.

9. A method of operating a base station to receive a Hybrid Automatic Repeat reQuest Acknowledgment (HARQ-ACK) signal transmitted from a User Equipment (UE) in a Physical Uplink Control CHannel (PUCCH), the method comprising:

transmitting one or more Physical Downlink Control CHannels (PDCCHs) of a first type over respective one or more Transmission Time Interval (TTIs) within a total number of M TTIs and within a set j of Physical Resource Block (PRB) pairs, wherein a PRB pair includes a number of sub-carriers over a TTI, and wherein each PDCCH is transmitted over a respective number of Control Channel Elements (CCEs) and conveys a Downlink Control Information (DCI) format that includes a HARQ-ACK Resource Offset (HRO) information field having Q binary elements;

determining a PUCCH resource $n_{PUCCH}$ in response to a PDCCH transmission in TTI m, $0 \leq m \leq M-1$, as $$n_{PUCCH} = n_{CCE,m,j} + f(HRO) + \sum_{i=0}^{m-1} N_{CCE,i,j} + N_{PUCCH,j},$$

wherein $n_{CCE,m,j}$ is an index for a first CCE of the PDCCH in TTI m, $f(HRO)$ is a mapping function for the HRO information field having an even number of integer outputs, $N_{CCE,i,j}$ is a total number of CCEs in TTI i, and $N_{PUCCH,j}$ is informed to the UE from the base station by higher layer signaling, and wherein for m=0 all $f(HRO)$ values are small integers and for m>0 a first even number of $f(HRO)$ values are same as for m=0 and do not depend on a value of m and a remaining second even number of $f(HRO)$ values are larger negative integers that depend on the value of m and include a term that is a sum of one or more $-N_{CCE,i,j}$ values where $0 \leq i \leq m-1$; and receiving the HARQ-ACK signal in the determined PUCCH resource.

10. The method of claim 9, wherein Q=2, the first even number of $f(HRO)$ values is two, and the remaining second even number of $f(HRO)$ values is two with a first value including the term $$-\sum_{i=0}^{m-1} N_{CCE,i,j}.$$

11. The method of claim 10, wherein a second value of the remaining second even number of $f(HRO)$ values includes a term $-N_{CCE,m-1,j}$.

12. The method of claim 9, wherein for m=0 the $f(HRO)$ values are $\{-2, -1, 0, 2\}$.

13. The method of claim 9, wherein a first value of Q is associated with a first value of M and a second value of Q is associated with a second value of M, wherein the first value of Q is smaller than the second value of Q and the first value of M is smaller than the second value of M.

14. The method of claim 9, wherein the DCI format includes a Downlink Assignment Index (DAI) field, the DAI field at TTI m indicating a total number of DCI formats transmitted to the UE from TTI 0 until TTI m and wherein, at least for some values of m, at least one binary element from the DAI field is used as a binary element of the HRO field.

15. The method of claim 9, wherein the base station transmits to the UE a PDCCH of a second type in TTI $m_1$, $0 \leq m_1 \leq m-1$ and $m>0$.

16. The method of claim 9, wherein the PDCCH is transmitted within one PRB pair and $n_{CCE,m,j}$ is replaced by:

$$n_{CCE,m,j}^L = \lfloor n_{CCE,m,j}/N_{CCE\_PRB,m,j} \rfloor + (n_{CCE,m,j} \bmod N_{CCE\_PRB,m,j}) \cdot N_{PRB,j}$$

where $N_{CCE\_PRB,m,j}$ is a number of CCEs within a PRB pair, $N_{PRB,j}$ is a total number of PRB pairs in the set j of PRB pairs, and $\lfloor \ \rfloor$ is a floor function that rounds a number to a next integer that is less than or equal to the number.

17. An apparatus in a User Equipment (UE) capable of transmitting a Hybrid Automatic Repeat reQuest Acknowledgment (HARQ-ACK) signal in a Physical Uplink Control CHannel (PUCCH), the apparatus comprising:
a detector configured to detect one or more Physical Downlink Control CHannels (PDCCHs) of a first type transmitted from a base station over respective one or more Transmission Time Interval (TTIs) within a total number of M TTIs and within a set j of Physical Resource Block (PRB) pairs, wherein a PRB pair includes a number of sub-carriers over a TTI, and wherein each PDCCH is detected over a respective number of Control Channel Elements (CCEs) and conveys a Downlink Control Information (DCI) format that includes a HARQ-ACK Resource Offset (HRO) information field having Q binary elements;
a computing unit configured to determine a PUCCH resource $n_{PUCCH}$ in response to a PDCCH detection in TTI m, $0 \leq m \leq M-1$, as $$n_{PUCCH} = n_{CCE,m,j} + f(HRO) + \sum_{i=0}^{m-1} N_{CCE,i,j} + N_{PUCCH,j},$$

wherein $n_{CCE,m,j}$ is an index for a first CCE of the PDCCH in TTI m, $f(HRO)$ is a mapping function for the HRO information field having an even number of integer outputs, $N_{CCE,i,j}$ is a total number of CCEs in TTI i, and $N_{PUCCH,j}$ is informed to the apparatus from the base station by higher layer signaling, and wherein for m=0 all $f(HRO)$ values are small integers and for m>0 a first even number of $f(HRO)$ values are same as for m=0 and do not depend on a value of m and a remaining second even number of $f(HRO)$ values are larger negative integers that depend on the value of m and include a term that is a sum of one or more $-N_{CCE,i,j}$ values where $0 \leq i \leq m-1$; and
a transmitter configured to transmit the HARQ-ACK signal in the determined PUCCH resource.

18. The apparatus of claim 17, wherein Q=2, the first even number of $f(HRO)$ values is two, and the remaining second even number of $f(HRO)$ values is two with a first value including a term $$-\sum_{i=0}^{m-1} N_{CCE,i,j}.$$

19. The apparatus of claim 18, wherein a second value of the remaining second even number of $f(HRO)$ values includes a term $-N_{CCE,m-1,j}$.

20. The apparatus of claim 17, wherein for m=0 the $f(HRO)$ values are $\{-2, -1, 0, 2\}$.

21. The apparatus of claim 17, wherein a first value of Q is associated with a first value of M and a second value of Q is associated with a second value of M, wherein the first value of Q is smaller than the second value of Q and the first value of M is smaller than the second value of M.

22. The apparatus of claim 17, wherein the DCI format includes a Downlink Assignment Index (DAI) field, the DAI field at TTI m indicating a total number of DCI formats transmitted to the UE from TTI 0 until TTI m and wherein, at least for some values of m, at least one binary element from the DAI field is used as a binary element of the HRO field.

23. The apparatus of claim 17, wherein the apparatus detects a PDCCH of a second type in TTI $m_1$, $0 \leq m_1 \leq m-1$ and $m>0$.

24. The apparatus of claim 17, wherein the PDCCH is transmitted within one PRB pair and $n_{CCE,m,j}$ is replaced by:

$$n_{CCE,m,j}^L = \lfloor n_{CCE,m,j}/N_{CCE\_PRB,m,j} \rfloor + (n_{CCE,m,j} \bmod N_{CCE\_PRB,m,j}) \cdot N_{PRB,j}$$

where $N_{CCE\_PRB,m,j}$ is a number of CCEs within a PRB pair, $N_{PRB,j}$ is a total number of PRB pairs in the set j of PRB pairs, and $\lfloor \ \rfloor$ is a floor function that rounds a number to a next integer that is less than or equal to the number.

25. An apparatus in a base station capable of receiving a Hybrid Automatic Repeat reQuest Acknowledgment (HARQ-ACK) signal transmitted from a User Equipment (UE) in a Physical Uplink Control CHannel (PUCCH), the apparatus comprising:
a transmitter configured to transmit one or more Physical Downlink Control CHannels (PDCCHs) of a first type over respective one or more Transmission Time Interval (TTIs) within a total number of M TTIs and within a set j of Physical Resource Block (PRB) pairs, wherein a PRB pair includes a number of sub-carriers over a TTI, and wherein each PDCCH is transmitted over a respective number of Control Channel Elements (CCEs) and conveys a Downlink Control Information (DCI) format that includes a HARQ-ACK Resource Offset (HRO) information field having Q binary elements;
a computing unit configured to determine a PUCCH resource $n_{PUCCH}$ in response to a PDCCH transmission in TTI m, $0 \leq m \leq M-1$, as $$n_{PUCCH} = n_{CCE,m,j} + f(HRO) + \sum_{i=0}^{m-1} N_{CCE,i,j} + N_{PUCCH,j},$$

wherein $n_{CCE,m,j}$ is an index for a first CCE of the PDCCH in TTI m, $f(HRO)$ is a mapping function for the HRO information field having an even number of integer outputs, $N_{CCE,i,j}$ is a total number of CCEs in TTI i, and $N_{PUCCH,j}$ is informed to the UE from the base station by higher layer signaling, and wherein for m=0 all $f(HRO)$ values are small integers and for m>0 a first even number of $f(HRO)$ values are same as for m=0 and do not depend on a value of m and a remaining second even number of $f(HRO)$ values are larger negative integers that depend on the value of m and include a term that is a sum of one or more $-N_{CCE,i,j}$ values where $0 \leq i \leq m-1$; and
a receiver configured to receive the HARQ-ACK signal in the determined PUCCH resource.

26. The apparatus of claim 25, wherein Q=2, the first even number of $f(HRO)$ values is two, and the remaining second even number of $f(HRO)$ values is two with a first value including the term $$-\sum_{i=0}^{m-1} N_{CCE,i,j}.$$

27. The apparatus of claim 26, wherein a second value of the remaining second even number of $f(HRO)$ values includes a term $-N_{CCE,m-1,j}$.

28. The apparatus of claim 25, wherein for m=0 the $f(HRO)$ values are $\{-2, -1, 0, 2\}$.

29. The apparatus of claim 25, wherein a first value of Q is associated with a first value of M and a second value of Q is associated with a second value of M, wherein the first value of Q is smaller than the second value of Q and the first value of M is smaller than the second value of M.

30. The apparatus of claim 25, wherein the DCI format includes a Downlink Assignment Index (DAI) field, the DAI field at TTI m indicating a total number of DCI formats transmitted to the UE from TTI 0 until TTI m and wherein, at least for some values of m, at least one binary element from the DAI field is used as a binary element of the HRO field.

31. The apparatus of claim 25, wherein the apparatus transmits to the UE a PDCCH of a second type in TTI $m_1$, $0 \leq m_1 \leq m-1$ and $m>0$.

32. The apparatus of claim 25, wherein the PDCCH is transmitted within one PRB pair and $n_{CCE,m,j}$ is replaced by:

$$n_{CCE,m,j}^L = \lfloor n_{CCE,m,j}/N_{CCE\_PRB,m,j} \rfloor + (n_{CCE,m,j} \bmod N_{CCE\_PRB,m,j}) \cdot N_{PRB,j}$$

where $N_{CCE\_PRB,m,j}$ is a number of CCEs within a PRB pair, $N_{PRB,j}$ is a total number of PRB pairs in the set j of PRB pairs, and $\lfloor \ \rfloor$ is a floor function that rounds a number to a next integer that is less than or equal to the number.

* * * * *